United States Patent [19]

Sasazawa et al.

[11] 4,066,565

[45] Jan. 3, 1978

[54] PROCESS FOR PRODUCING COBALT- AND IRON-CONTAINING FERROMAGNETIC POWDER

[75] Inventors: Koji Sasazawa; Shin-Ichiro Dezawa; Tatsuji Kitamoto, all of Odawara, Japan

[73] Assignee: Fuji Photo Film Co., Ltd., Minami-ashigara, Japan

[21] Appl. No.: 702,172

[22] Filed: July 2, 1976

[30] Foreign Application Priority Data

July 2, 1975 Japan .................................. 50-82076

[51] Int. Cl.$^2$ ...................... C01G 49/06; C01G 49/08
[52] U.S. Cl. ................................. 252/62.56; 427/127; 427/128; 427/130
[58] Field of Search ...................... 252/62.56, 62.55; 423/633, 634; 427/127, 128, 130

[56] References Cited

U.S. PATENT DOCUMENTS

3,075,919  1/1963  Gruber et al. .................... 252/62.56

FOREIGN PATENT DOCUMENTS

2,235,383  2/1973  Germany ........................ 252/62.56
2,413,430  10/1974  Germany ........................ 252/62.56

OTHER PUBLICATIONS

Umeki "Chem. Abstracts", vol. 82, 1975, 79751v.

*Primary Examiner*—Jack Cooper
*Attorney, Agent, or Firm*—Sughrue, Rothwell, Mion, Zinn and Macpeak

[57] ABSTRACT

Co- and Fe-containing ferromagnetic iron oxide powder having a high coercive force and improved stability to heat and pressure is produced by adding an aqueous alkali solution, an aqueous solution containing $Co^{+2}$ ions, and an aqueous solution containing not more than 1 equivalent, based on the $Co^{+2}$ ions, of $Fe^{+3}$ ions to a suspension of a ferromagnetic iron oxide, and heating the mixture at a temperature of at least about 80° C, preferably 90° to 105° C. The ferromagnetic iron oxide powder is especially suitable for producing magnetic recording media.

15 Claims, 1 Drawing Figure

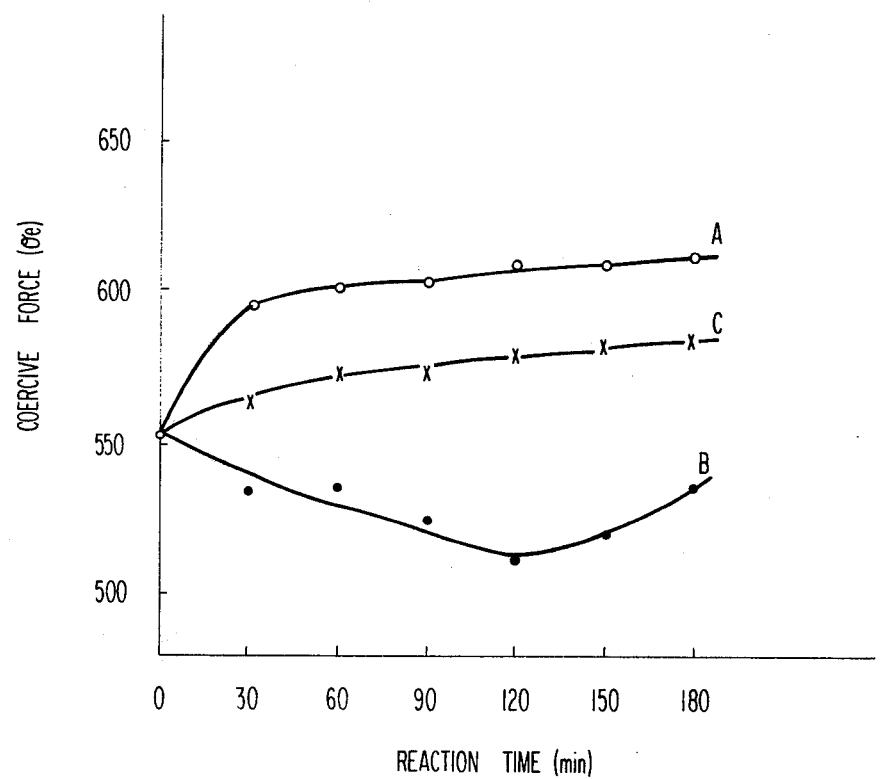

PROCESS FOR PRODUCING COBALT- AND IRON-CONTAINING FERROMAGNETIC POWDER

BACKGROUND OF THE INVENTION

1. Field of the Invention

This invention relates to ferromagnetic iron oxide powder for magnetic recording, specifically, to ferromagnetic iron oxide powder having a high coercive force and improved stability to pressure and heat.

2. Description of the Prior Art

Ferromagnetic iron oxides for magnetic recording are required to have a high coercive force and exhibit superior orientability.

One effective means of increasing the coercive force of ferromagnetic iron oxide powder involves incorporating cobalt ions in the iron oxide to form a solid solution, and various methods of this type are suggested, for example, in U.S. Pat. Nos. 3,117,933 and 3,671,435, Japanese patent application (Laid Open) No. 101,599/73, and Japanese patent publication Nos. 6,538/66, 4,264/74, 27,719/66 (corresponding to U.S. Pat. No. 3,573,980), 15,759/73, 10,994/73 and 6,113/67. Magnetic recording media, such as magnetic tapes, made using the cobalt-containing iron oxides produced by such methods, however, have the defect that they are unstable to pressure and head, and the magnetic signals recorded become weak or are transferred to a great extent.

Other methods for increasing coercive force comprise adhering a layer of a cobalt compound or cobalt ferrite to the surface of magnetic iron oxide powder free of cobalt in the form of a solid solution, or growing such a layer on the surface thereof. Such methods are specifically disclosed, for example, in Japanese patent applications (Laid Open) No. 108,599/74, 37,667/75 and 37,668/75 and Japanese patent publication No. 49,475/74. Ferromagnetic iron oxide powders obtained by these methods are stable to pressure and heat and have improved print through characteristics as compared with those obtained by forming an iron oxide-cobalt solid solution per se.

The methods which comprise adhering a cobalt compound to the surface of a ferromagnetic iron oxide not containing cobalt can afford a product having a coercive force of about 500 to 600 Oe at the highest. On the other hand, by methods involving growing a cobalt ferrite layer, the coercive force of the resulting product is nearly proportional to the volume of the cobalt ferrite layer grown on the surface. The cobalt ferrite layer is a magnetic oxide layer in which cobalt is dissolved to form a solid solution, and is unstable to pressure and heat. This defect of the cobalt ferrite layer grown on the surface gradually shows itself, and this method, as a result cannot provide ferromagnetic iron oxide powder having a high coercive force and improved stability to pressure and heat.

SUMMARY OF THE INVENTION

It is one object of this invention to provide a ferromagnetic iron oxide powder for magnetic recording having a high coercive force, improved stability to pressure and heat and improved print through characteristics by adhering a cobalt-containing layer onto the surface of an acicular magnetic iron oxide free from cobalt.

In particular, this invention relates to an improvement in processes for increasing the coercive force of ferromagnetic iron oxide powder by precipitating a cobalt-containing compound in solution as disclosed, for example, in Japanese patent application (laid open) Nos. 108,599/74, 37,667/75 and 37,668/75, which are similar to methods of precipitating ferrite onto acicular particles as disclosed in Japanese patent publication Nos. 5,515/61 and 4,825/62.

According to this invention, there is provided a process for producing a Co- and Fe-containing ferromagnetic powder which comprises adding an aqueous alkali solution and an aqueous solution containing $Co^{+2}$ ions to a suspension of ferromagnetic iron oxide and heating the mixture, wherein not more than 1 equivalent, based on the $Co^{+2}$ ions, of $Fe^{+3}$ ions is added to the suspension, and the heating is carried out at a temperature of at least about 80° C.

BRIEF DESCRIPTION OF THE DRAWINGS

The drawing is a graphical presentation of results achieved in the Examples, showing the relationship between the coercive force (oersteds) and the reaction time (minutes) for certain samples prepared in the Examples.

DETAILED DESCRIPTION OF THE INVENTION

We have extensively investigated methods of adhering or growing a cobalt compound layer on the surface of acicular iron oxide powder not containing cobalt, and found that by adhering a layer containing cobalt and not more than 1 equivalent, preferably at least 0.1 molar equivalent to 1 molar equivalent, based on the cobalt, of $Fe^{+3}$ ions (ferric ions) onto the surface of acicular iron oxide, a magnetic powder having a higher coercive force than in the case of adhering or growing only a cobalt compound layer or a cobalt ferrite layer can be obtained. In the present specification and claims, the term "not containing cobalt" means that if cobalt is present as an impurity it is present in an amount of at most about 0.25 atomic %, and it is most preferred that cobalt not be present even as an impurity. In any case, the amount of cobalt present must be so low that no effects due to cobalt appear.

The detailed mechanism of this phenomenon is not completely clear, but it is believed that the presence of the $Fe^{+3}$ ions exerts some influence on the arrangement of the $Co^{+2}$ ions. Experiments show that the presence of $Fe^{+2}$ ions rather results in reduced coercive force, and hence, $Fe^{+3}$ ions have been found to be important.

Since cobalt is divalent, the addition of it together with $Fe^{+3}$ ions induces a coprecipitation and results in the precipitation of cobalt ferrite to some extent. In order to avoid this unfavorable result, it is necessary, for example, to add the $Fe^{+3}$ ions dropwise to an alkali solution containing cobalt hydroxide and having acicular iron oxide dispersed therein, or to add the cobalt solution and the $Fe^{+3}$ solution dropwise alternately. By dropwise alternate addition, it is possible to obtain a more uniform layer of Fe/Co. The exact rate of dropwise addition is not important, and can be selected from conditions as are conventionally used in this art.

In order to increase the coercive force, the amount of cobalt is required to be at least about 0.5 atomic percent based on the total amount of iron which constitutes the acicular magnetic iron oxide as a nucleus. Usually, cobalt in an amount of more than 10 atomic percent contributes little to the increase of the coercive force, and, for economic reasons, such will not generally be used, though it is possible to use such greater amounts if one wishes. The effective amount of $Fe^{+3}$ ion is at least about 0.1 equivalent based on the amount of cobalt. Amounts of more than 1 equivalent, however, result in a reduced effect of increasing the coercive force.

The acicular magnetic iron oxide used as a nucleus is preferably one which has a high coercive force by shape anisotropy and superior dispersibility and orientability. The use of such acicular magnetic iron oxide insures that the shape of the starting particles is maintained even after adhering a cobalt-ferric ion layer to the surface, and the particles have good dispersibility and orientability. The high coercive force of the starting powder makes it possible to use only a small amount of cobalt in order to obtain the desired coercive force, and that is commercially advantageous.

The ferromagnetic iron oxide used in this invention includes, for example, maghemite ($\gamma$-$Fe_2O_3$), magnetite ($Fe_3O_4$), Berthollide iron oxides (iron oxides having a degree of oxidation intermediate maghemite and magnetite; $FeO_x$ in which $1.33 < x < 1.50$), and partly oxidized metallic iron, most preferably such iron where the average composition is such that, if represented by the formula $FeO_x$, $x$ is greater than about 0.5. These iron oxides have an acicular ratio of about 2/1 to about 20/1, preferably 4/1 to 12/1, and an average particle length of about 0.3 to about 1.5 μm, preferably 0.4 to 1 μm. Of these, maghemite and magnetite usually have a coercive force (Hc) of about 250 to 450 Oe. The Berthollide iron oxide obtained by oxidizing or reducing maghemite and magnetite is approximately $FeO_{1.35}$ and has a coercive force about 30 Oe higher than maghemite and magnetite. The above described iron oxides wherein $x$ is $1.33 < x < 1.50$ are preferably used in this invention. The amount of the ferromagnetic iron oxide present in the reaction system is not overly important, and exemplary proportions are given in the Examples.

The aqueous solution containing $Co^{+2}$ ions is an aqueous solution having dissolved therein a water soluble cobalt salt and/or an aqueous solution containing divalent cobalt hydroxide. It is reacted with the ferromagnetic iron oxide together with the $Fe^{+3}$ ions.

The water soluble cobalt salts are compounds which yield $Co^{+2}$ ions in water, and include, for example, inorganic salts, inorganic acid salts, organic acid salts, and complex salts of cobalt. These water soluble cobalt salts most preferably exhibit a water solubility of greater than 2 g/100 ml of water at 25° C (hereafter merely g/100 ml. Specific examples of such cobalt salts are cobalt inorganic acid salts such as cobalt sulfate, cobalt nitrate, cobalt perchlorate, cobalt fluorosilicate, cobalt ammonium sulfate, and cobalt ammonium chloride; cobalt organic acid salts such as cobalt acetate, cobalt citrate, cobalt tartrate, and cobalt formate; cobalt halides such as cobalt chloride, cobalt bromide, cobalt fluoride, and cobalt iodide; and cobalt complex salts such as hexammine cobalt chloride, hexammine cobalt nitrate, ethylenediamine cobalt chloride, and cesium hexafluorocobalt. Of these, the chlorides, sulfates, nitrates, bromides, fluorides, iodides, perchlorates, acetates, benzoates, hexammine chlorides, hexammine nitrates, hexammine sulfates, aquopentammine chlorides, ethylenediamine chlorides, and ammonium sulfates of cobalt are especially suitable.

The amount of the water soluble cobalt salt added is about 0.5 to about 10 atomic percent, preferably 0.8 to 5 atomic percent, based on the iron present in the ferromagnetic iron oxide. The cobalt is substantially stoichiometrically incorporated into the iron in the final product.

$Fe^{+3}$ ions are provided by adding water soluble ferric salts. Examples of the ferric salts include ferric chloride, ferric perchlorate, ferric bromide, ferric nitrate, ferric iodide, ferric sulfate, and ferric ammonium sulfate.

Examples of the alkali used in this invention are alkali hydroxides such as sodium hydroxide, potassium hydroxide or lithium hydroxide, alkali carbonates such as sodium carbonate or potassium carbonate, ammonia water, aliphatic or aromatic amines such as monoethanolamine or p-phenylenediamine, and mixtures thereof. These alkaline substances are used as a solution in water.

The total amount of the alkali is such that after it has neutralized the $Co^{+2}$ ions and $Fe^{+3}$ ions, the $[OH^-]$ concentration of the slurry is at least about 0.5 mol/liter. It is most preferred that the alkali be used in a maximum amount of about 3 mols/liter, and operation is most conveniently conducted utilizing a total amount of alkali of from 0.5 to 2.5 mols/liter. The reaction temperature should be at least about 80° C. If either or both of the reaction temperature and the $OH^-$ concentration are below the specified ranges, it is difficult to obtain a magnetic powder having a high coercive force, and therefore, such conditions are commercially unacceptable.

The process for producing ferromagnetic iron oxide powders in accordance with this invention is described in greater detail below.

First, particles of ferromagnetic iron oxide, such as maghemite particles, magnetite particles, or Berthollide iron oxide particles, are dispersed in water. While the resulting suspension is being continuously stirred, one of the following four steps is performed.

A. Add an aqueous solution containing $Co^{+2}$ ions, then an aqueous alkali solution, and finally an aqueous solution containing $Fe^{+3}$ ions.

B. Add an aqueous alkali solution, then an aqueous solution containing $Co^{+2}$ ions, and finally an aqueous solution containing $Fe^{+3}$ ions.

C. In step (B), the aqueous alkali solution is divided into two portions, and one portion is added after the addition of the $Fe^{+3}$ ion solution (portion-wise addition).

D. The aqueous alkali solution, the aqueous solution containing $Fe^{+3}$ ions are each divided into at least containing $Fe^{+3}$ ions are each divided into at least two portions, and step (C) is repeated. Finally, the aqueous alkali solution is added (repeated portion-wise addition).

It is generally most convenient to divide the alkali solution and the $Co^{+2}$ solution into equal portions for each portion-wise addition for the particular solution involved, though, of course, this is not mandatory. Often, when the alkali solution is initially added, the amount used will be 0.7 to 1 time that required to neutralize the $Co^{+2}$ and other cation(s).

In any of steps (A) to (D), cobalt hydroxide can be used instead of the aqueous solution containing $Co^{+2}$ ions, the cobalt hydroxide solution being of a strength so as to provide essentially the same amount of $Co^{+2}$ ions as the aqueous solution containing $Co^{+2}$ ions earlier discussed.

Preferably, the suspension is continuously stirred even when performing steps (A) to (D). Stirring is performed by conventional means, e.g., a stirrer, ultrasonic oscillations, etc.

In steps (B) to (D), the first addition of the aqueous alkali solution can be omitted if the suspension of the starting ferromagnetic iron oxide is prepared using an aqueous alkali solution instead of water, typically such an aqueous alkali solution showing a pH of at least about 9.

The resulting alkali solution slurry (containing $Co^{+2}$ ions and $Fe^{+3}$ ions) of iron oxide is continuously stirred and reacted at a temperature of at least about 80° C.

After addition, the solutions must be homogenized in the suspension by thorough stirring, andd for this purpose, stirring is usually carried out for 30 to 60 minutes. The stirring time is not overly important, and the range of 30 to 60 minutes is merely selected for purposes of convenience. Stirring need only be continued for a time sufficient to homogenize the system, and with highly efficient homogenizing means very short stirring times are effective since the reaction of the present invention is a very rapid reaction. By performing the precipitation reaction in multiple stages as in the methods (C) and (D), uniform precipitation is performed. This serves to further increase the coercive force and narrow the coercive force distribution as intended in the present invention.

It is usually operationally advantageous to heat the suspension after all of the reaction solutions have been added, but it may be heated from the outset, or during the addition of the reaction solutions. The exact time of initiating heating is not overly important to the present invention, however. The heating temperature is desirably from about 80° C to about 150° C, and the reaction is carried out most preferably at 90° to 105° C in the boiling state.

Temperatures of less than about 80° C are commercially disadvantageous because long periods of time are required for increasing the coercive force. If the temperature is above 105° C, no merit is obtained in performing the reaction in a reactor at atmospheric pressure. It is, of course, possible to heat the suspension of the ferromagnetic powder at temperatures as high as up to about 150° C using an autoclave. The reaction is conveniently performed at atmospheric pressure, though this is not limitative, of course. Reaction is often conducted using a heating time of from about 30 minutes to about 5 hours.

In order to remove excess alkali in the reaction mixture, it is washed with water until its pH becomes not more than about 9.5, preferably not more than 8.5. Then, it is dehydrated by, for example, filtration or centrifugal separation. The residue is then dried at a temperature of about 40° to about 200° C. The drying time is not overly important, and is merely selected and correlated with the temperature involved (higher temperature, lower drying time; lower temperature, higher drying temperature) to achieve the desired degree of drying.

The above process steps are applicable when the starting ferromagnetic iron oxide is maghemite ($\gamma$-$Fe_2O_3$). In the case of magnetite ($Fe_3O_4$) or Berthollide iron oxides, the final drying step must be carried out in an inert gas such as $N_2$ or an inert gas such as He, Ne, Ar, Kr, Xe or Rn. This is because magnetite and Berthollide iron oxides are likely to be oxidized by heat when heat-dried in the air.

The above process steps thus afford ferromagnetic iron oxide powder containing Co. If desired, other metals such as Cr, Mn, Fe, Ni and Zn can be present with the Co by adding water soluble compounds of such a metal or metals to the reaction system. Generally, such secondary elements will be present in an amount no greater than about ⅔ the amount of the Co which is present, in which case the total amount of the Co and such one or more other metals is still about 0.5 to about 10 atomic percent, based on the iron present.

Where the resulting ferromagnetic iron oxide is magnetite or a Berthollide iron oxide, its degree of oxidation can be adjusted by further treating it in an oxidizing atmosphere, for example, by following the procedures as disclosed, for example, in Japanese patent publication Nos. 5,009/64 and 10,307/64.

It has been confirmed that the ferromagnetic iron oxide obtained by the process of this invention described hereinabove has a higher coercive force and better stability to pressure and heat than those obtained by conventional methods.

The ferromagnetic iron oxide thus obtained is useful in various applications. In particular, when it is used for producing magnetic recording media, the products have good characteristics.

A ferromagnetic powder of this invention obtained in the above manner can, for example, be dispersed in a binder, which is coated using an organic solvent on a base (support) and dried to form a magnetic layer for use as a magnetic recording medium.

The methods of preparing magnetic coating compositions used in this invention are described in detail, e.g., in Japanese patent publication Nos. 186/68, 28,043/72, 28,045/72, 28,046/72, 28,048/72 and 31,445/72, and U.S. Pat. No. 3,943,012. The magnetic coating compositions described in the above specifications contain as main components a ferromagnetic powder, a binder and a solvent for coating, and, optionally, contain additives such as a dispersing agent, a lubricant, an abrasive and an antistatic agent.

Hitherto known thermoplastic resins, thermosetting resins, or mixtures thereof, can be used as binders for the ferromagnetic metal powder of the present invention.

Suitable thermoplastic resins are those resins which have a softening point of about 150° C or less, an average molecular weight of about 10,000 to 200,000, and a degree of polymerization on the order of about 200 to 2,000, e.g., a vinyl chloride-vinyl acetate copolymer, a vinyl chloride-vinylidene chloride copolymer, a vinyl chloride-acrylonitrile copolymer, an acrylate-acrylonitrile copolymer, an acrylate-vinylidene chloride copolymer, an acrylate-styrene copolymer, a methacrylate-acrylonitrile copolymer, a methacrylate-vinylidene chloride copolymer, a methacrylate-styrene copolymer, a urethane elastomer, a polyvinyl fluoride, a vinylidene chloride-acrylonitrile copolymer, a butadiene-acrylonitrile copolymer, a polyamide resin, polyvinyl butyral, cellulose derivatives such as cellulose acetate butyrate, cellulose diacetate, cellulose triacetate, cellulose propionate, cellulose nitrate, and the like, a styrene-butadiene copolymer, a polyester resin, a chlorovinyl ether-acrylate copolymer, an amino resin, various synthetic rubber based thermoplastic resins such as neoprene rubber, isoprene rubber, styrene-butadiene rubber, etc., and mixtures thereof.

Suitable examples of these resins which can be used are described in Japanese patent publication Nos. b 6,877/62, 12,528/64, 19,282/64, 5,349/65, 20,907/65, 9,463/66, 14,059/66, 16,985/66, 6,428/67, 11,621,67, 4,623/68, 15,206/68, 2,889/69, 17,947/69, 18,232/69, 14,020/70, 14,500/70, 18,573/72, 22,063/72, 22,064/72, 22,068/72, 22,069/72, 22,070/72, 27,886/73, U.S. Pat. Nos. 3,144,352, 2,419,420, 3,499,789, 3,713,887, etc.

Suitable thermosetting resins have a molecular weight of about 200,000 or less as a coating solution, and when heated after coating and drying, the molecular weight becomes infinite due to reactions such as condensation, addition, and the like. Of these resins, preferred resins are those resins which do not soften or melt before the resin thermally decomposes. Representative examples of these resins are a phenol resin, an epoxy resin, a polyurethane hardening type resin, a urea resin, a melamine resin, an alkyd resin, a silicone resin, an acryl based reactive resin, an epoxy-polyamide resin, a mixture of a high molecular weight polyester resin and an isocyanate prepolymer, a mixture of a methacrylic acid copolymer and a diisocyanate prepolymer, a mixture of a polyester-polyol and a polyisocyanate, a urea-formaldehyde resin, a mixture of a low molecular weight glycol, a high molecular weight diol and triphenylmethane triisocyanate, a polyamine resin, and mixtures thereof, etc.

Suitable examples of these resins which can be used are described in Japanese patent publication Nos. 8,103/64, 9,779/65, 7,192/66, 8,016/66, 14,275/66, 18,179/67, 12,081/68, 28,023/69, 14,501/70, 24,902/70, 13,103/71, 22,065/72, 22,066/72, 22,067/72, 22,072/72, 22,073/72, 28,045/72, 28,048/72, 28,922/72, U.S. Pat. Nos. 3,144,353, 3,320,090, 2,437,510, 3,597,273, 3,781,210, 3,781,211, etc.

These binders can be used individually or in combination with each other, and other additives can be added to the binders. The weight ratio of the ferromagnetic powder to the binder is generally about 100:10 to 100:200. When the proportion of the binder is less than about 10 parts by weight, the ability of the binder to bind the fine ferromagnetic powder becomes weak, and the ferromagnetic powder tends to come off from the magnetic layer. This leads to the disadvantage that the fine ferromagnetic powder that has come off adheres to the magnetic head, or damages the surface of the magnetic layer. On the other hand, when the proportion of the binder is above about 200 parts by weight, the magnetic flux density of the magnetic layer is reduced because the non-magnetic property of the binder dominates the layer characteristics.

The magnetic recording layer may contain, in addition to the aforesaid binder and the ferromagnetic powders, additives such as a dispersing agent, a lubricant, an abrasive and an antistatic agent.

The dispersing agents used include aliphatic acids having 12 to 18 carbon atoms ($R_1COOH$ wherein $R_1$ is an alkyl group having 11 to 17 carbon atoms) such as caprylic acid, capric acid, lauric acid, myristic acid, palmitic acid, stearic acid, oleic acid, elaidic acid, linolic acid, linolenic acid and stearolic acid; metal soaps comprising an alkali metal (such as Li, Na and K) or an alkaline earth metal (such as Mg, Ca and Ba) salt of the above aliphatic acids; lecithin, etc. In addition, higher alcohols having 12 or more carbon atoms and sulfuric esters can be used. These dispersing agents are added in an amount of 1 to 20 parts by weight per 100 parts by weight of the binder.

The lubricants used include silicone oil, carbon black, graphite, a carbon black-grafted polymer, molybdenum disulfide, tungsten disulfide, aliphatic esters obtained from monobasic aliphatic acids having 12 to 16 carbon atoms and monohydric alcohols having 3 to 12 carbon atoms, aliphatic esters obtained from monobasic aliphatic acids having 17 or more carbon atoms and monohydric alcohols (the carbon atoms of the monobasic aliphatic acid and the carbon atoms of the monohydric alcohol total 21 to 23), etc. These lubricants are added in an amount of 0.2 to 20 parts by weight per 100 parts by weight of the binder. These lubricants are described, e.g., in Japanese patent publication No. 23,889/68, Japanese patent application Nos. 28,647/67 and 81,543/68, U.S. Pat. Nos. 3,470,021, 3,492,235, 3,497,411, 3,523,086, 3,625,760, 3,630,772, 3,634,253, 3,642,539 and 3,687,725, *IBM Technical Disclosure Bulletin*, Vol. 9, No. 7, page 779 (Dec. 1966), *ELEKTRONIK*, No. 12, page 380 (1961), etc.

The abrasives used include those which are generally used, such as fused alumina, silicon carbide, chromium oxide ($Cr_2O_3$), corundum, artificial corundum, diamond, artificial diamond, garnet and emery (main components: corundum and magnetite). The average particle diameter of these abrasives is 0.05 to 5 $\mu$, preferably 0.1 to 2 $\mu$. These abrasives are added in an amount of 7 to 20 parts by weight per 100 parts by weight of the binder. These abrasives are described in Japanese patent application No. 26,749/73, U.S. Pat. Nos. 3,007,807, 3,041,196, 3,293,066, 3,630,910 and 3,687,725, British Pat. No. 1,145,349, and West German Pat. No. 853,211.

Examples of the antistatic agent are electrically conductive powders such as graphite or carbon black. The amount of the antistatic agent, when used, is about 5 parts by weight per 100 parts by weight of the ferromagnetic powder.

These antistatic agents are described, for example, in Japanese patent publication Nos. 2,613/65, 24,881/72, 15,440/73, and 3,642/75, U.S. Pat. Nos. 2,804,401, 3,293,066, and 3,647,539, British Pat. No. 793,520, and *IBM Technical Disclosure Bulletin*, Vol. 6, No. 12, page 4 (May 1964).

In order to disperse the ferromagnetic powder into the binder, conventional methods are utilized. For example, ball milling, vibratory milling, sand milling, colloid milling and combinations thereof can be used. In some cases, ultrasonic vibration can be jointly used therewith. Various types of kneaders can be used in performing the dispersion. Examples include a two-roll mill, a three-roll mill, a ball mill, a pebble mill, a trommel, a sand grinder, a Szegvari attritor, a high speed impeller, a high speed stone mill, a high speed impact mill, a disperser, a kneader, a high speed mixer, a homogenizer, and an ultrasonic dispersing apparatus.

Various useful techniques relating to kneading and dispersing are described in T.C. Patton, *Paint Flow and Pigment Dispersion*, 1964, John Wiley & Sons, and in U.S. Pat. Nos. 2,581,414 and 2,855,156.

Magnetic recording layers are formed by dissolving the above components in an organic solvent to make a coating composition and then coating the same on a support.

The thickness of the support used is conventional and is about 5 to 50 $\mu$m, preferably about 10 to 40 $\mu$m. The materials used for the support include polyesters such as polyethylene terephthalate and polyethylene-2,6-naphthalate, polyolefins such as polypropylene, cellulose derivatives such as cellulose triacetate and cellulose diacetate, polycarbonate, and the like.

For preventing static discharge or preventing transfer printing, the above supports may have a back coat on the surface opposite the surface provided with the magnetic layer. Descriptions of back coats are found, e.g., in U.S. Pat. Nos. 2,804,401, 3,293,066, 3,617,378, 3,062,676, 3,734,772, 3,476,596, 2,643,048, 2,803,556, 2,887,462, 2,923,642, 2,997,451, 3,007,892, 3,041,196, 3,115,420 and 3,166,688, etc.

The supports may be in any shape such as a tape, sheet, card, disc or drum, and various materials can be used depending upon the shape desired and end use contemplated.

The aforesaid magnetic recording layer can be coated on the support by various conventional methods including air doctor coating, blade coating, air knife coating, squeeze coating, impregnation coating, reverse roll coating, transfer roll coating, gravure coating, kiss coating, cast coating and spray coating. Other coating methods can also be used. The details of these methods are described in *Coating Engineering*, pp. 253 to 277, Asakura Publisher (March 20, 1971).

The organic solvents which can be used for coating include ketones such as acetone, methyl ethyl ketone, methyl isobutyl ketone and cyclohexanone; alcohols such as methanol, ethanol, propanol and butanol; esters such as methyl acetate, ethyl acetate, butyl acetate, ethyl lactate and glycol monoethyl ether acetate; glycol ethers such as ether, glycol dimethyl ether, glycol monoethyl ether and dioxane; aromatic hydrocarbons such as benzene, toluene and xylene; chlorinated hydrocarbons such as methylene chloride, ethylene chloride, carbon tetrachloride, chloroform, ethylene chlorohydrin and dichlorobenzene; and the like.

The magnetic layer coated on the support by the above method is dried after, if desired, the coating has been subjected to a treatment for orienting the magnetic powder in the layer. Suitable treatments for orienting the magnetic powder in the layer are disclosed in U.S. Pat. Nos. 1,949,840, 2,796,359, 3,001,891, 3,172,776, 3,416,949, 3,473,960 and 3,681,138; Japanese patent publication Nos. 3,427/57, 28,368/64, 23,624/65, 23,625/65, 13,181/66, 13,043/73 and 39,722/73. If required, the magnetic layer can be subjected to a surface smoothening treatment, or cut to the desired shape, to thereby form the magnetic recording material of this invention. Suitable surface smoothening techniques are disclosed in U.S. Pat. Nos. 2,688,567, 2,998,325 and 3,783,023, and German Patent Application No. (OPI) 2,405,222.

In the above orienting treatment for the magnetic layer, the orienting magnetic field can be either an AC or DC magnetic field with a field strength of about 500 to 2,000 gauss. The drying temperature can range from about 50° to about 100° C, and the drying time is about 3 to 10 minutes.

In the surface smoothening treatment of the magnetic layer, preferably a calendering method is used in which the magnetic layer is passed between a metal roll and a non-metallic roll while the layer is heated under pressure. A combination of a metal roll and a roll made of cotton and a combination of a metal roll and a roll made of a synthetic resin are especially preferred. The pressure used in this treatment is about 25 to 500 kg/cm, and the surface temperature of the metal roll is kept at about 35° to 150° C. The rate of the treatment is about 5 to 120 meters/min. When the pressure and temperature are below the lower limits of the above specified ranges, the effect of the surface smoothening treatment is difficult to achieve. Pressures and temperatures higher than the upper limits of the above specified ranges are not preferred because the support of the magnetic recording material is deformed. When the treating rate is less than about 5 meters/min the operating efficiency is low, and if the rate is above 120 meters/min, operation is difficult.

The most preferred process for the production of a magnetic recording medium disclosed above is the process disclosed in Japanese patent application No. (OPI) 41,506/75 (corresponding to U.S. patent application Ser. No. 498,337, filed on Aug. 19, 1974).

The following Examples and Comparative Examples specifically illustrate the present invention. The following Examples were all at room temperature, unless otherwise indicated.

EXAMPLE 1

400 g of Berthollide iron oxide ($FeO_x$ in which $x = 1.4$; $Fe^{+2}/Fe^{+3} = 0.25$; average particle length 0.5 μm; acicular ratio 8/1; coercive force Hc 420 Oe) was dispersed in 4 liters of an aqueous solution of sodium hydroxide (1 mol/liter).

Then, an aqueous solution of 40 g of cobalt sulfate ($CoSO_4 \cdot 7H_2O$) in 500 ml of water was added, and the mixture was heated (the rate of heating is not important). When the temperature of the mixture reached 95° C, a solution of 25 g of ferric sulfate ($Fe_2(SO_4)_3 \cdot 7H_2O$) in 500 ml of water was added dropwise over 2 hours at a rate of about 4 ml/min.

After the temperature of the mixture reached 95° C as described above, the reaction was continued for 3 hours at 95° C to the boiling point of the system (the total reaction time thus involving 2 hours for dropwise addition plus one hour of continued reaction). During this period, a part of the reaction mixture was collected every 30 minutes (i.e., sample collection was performed seven times). The seven magnetic iron oxide samples were filtered, washed with water, and dried at 60° C for about 10 hours. Using a fluxmeter of the type designed for a Vibrating Sample Magnetometer (Model VSM-III produced by Toei Kogyo Co., Ltd.), the coercive forces of the samples were measured in an external magnetic field of 5 KOe. The results are shown in Curve A of accompanying FIG. 1 which is a graphic representation showing the relationship between coercive force in oersteds as the ordinate and the reaction time in minutes as the abscissa.

COMPARATIVE EXAMPLE 1

The same reaction as in Example 1 was carried out except that an aqueous solution of 26 g of ferrous sulfate in 500 ml of water was added dropwise at a rate of about 4 ml/min over 2 hours instead of the aqueous solution of ferric sulfate. The coercive forces of seven samples collected in the same way as in Example 1 were measured, and the results are shown as Curve B of FIG. 1.

COMPARATIVE EXAMPLE 2

The same reaction as in Example 1 was carried out except that 500 ml of pure water was used instead of the aqueous solution of ferric sulfate. The coercive forces of seven samples collected in the same way as in Example 1 were measured, and the results are shown as Curve C of FIG. 1.

The results of Example 1 and Comparative Examples 1 and 2 shown as Curves A, B and C of FIG. 1 demonstrate that the addition of $Fe^{+3}$ ion is effective for increasing the coercive force of ferromagnetic iron oxide.

EXAMPLE 2

400 g of the same Berthollide iron oxide as was used in Example 1 was dispersed in 4 liters of an aqueous solution of sodium hydroxide (1 mol/liter). Then, 40 g of cobalt sulfate ($CoSO_4 \cdot 7H_2O$) was dissolved in 500 ml of water, and the solution was added to the dispersion. The mixture was then heated. When the temperature of the mixture reached 95° C, ferric sulfate weighed to an amount of 0.25 equivalent based on the cobalt was dissolved in 500 ml of water, and the solution was added dropwise at a rate of about 4 ml/min over the course of 2 hours. The reaction was carried out for 3 hours at from 95° C to the boiling point of the system (2 hours of dropwise additon and one hour of additional reaction). The resulting ferromagnetic powder was washed with water, filtered, and dried at 60° C for about 10 hours, and its coercive force measured.

The same reaction was carried out using ferric sulfate in varying amounts of up to 1.5 equivalents based on the cobalt to obtain samples 2-1 to 2-5. The coercive forces of these samples were also measured, and the results are shown in Table 1 together with those obtained in Comparative Example 2.

TABLE 1

| Sample No. | $Fe^{+3}/Co^{+2}$ (atomic ratio) | Coercive Force Hc (Oe) |
|---|---|---|
| Comparative Example 2 | $Fe^{+3}$ not added | 586 |
| 2-1 | 0.25 | 596 |
| 2-2 | 0.5 | 613 |
| 2-3 | 0.75 | 604 |
| 2-4 | 1.0 | 591 |
| 2-5 | 1.5 | 578 |

This Example illustrates that the alternate addition method of the present invention is also effective for purposes of the present invention.

EXAMPLE 3

400 g of the same Berthollide iron oxide as was used in Example 1 was dispersed in 4 liters of an aqueous solution of sodium hydroxide (1 mol/liter), and the dispersion was heated to 95° C. Then, an aqueous solution of 40 g of cobalt sulfate ($CoSO_4 \cdot 7H_2O$) in 500 ml of water and an aqueous solution of 25 g of ferric sulfate in 500 ml of water was prepared, and alternately added dropwise every 5 minutes. By proceeding in this manner, i.e., adding a portion of the Fe ions over a 5 minute and then the required amount of the Co ions over a 5 minute period, etc., until the total amount of all solutions was added, a more uniform coating was obtained. The addition of all of these solutions was completed in about 2 hours. After continuing the reaction for 1 hour at 95° C to the boiling point of the system, the product was washed with water, filtered and dried at 60° C. The coercive force of the product was then measured and found to be 620 Oe.

It was confirmed by the results of the above Examples that Co- and Fe-containing ferromagnetic iron oxides produced by the process of this invention using $Fe^{+3}$ ions have high coercive force.

While the invention has been described in detail and with reference to specific embodiments thereof, it will be apparent to one skilled in the art that various changes and modifications can be made therein without departing from the spirit and scope thereof.

What is claimed is:

1. A process for producing a Co- and Fe- containing ferromagnetic iron oxide powder which comprises adding an aqueous alkali solution, an aqueous solution containing $Co^{+2}$ ions and an aqueous solution of $Fe^{+3}$ ions to a suspension of an acicular ferromagnetic iron oxide and heat-treating the resulting suspension, at a temperature of at least about 80° C;

said $Co^{+2}$ ions being present in said aqueous solution containing $Co^{+2}$ ions in an amount of 0.5 to about 10 atomic percent based on the iron present in the ferromagnetic iron oxide, said $Fe^{+3}$ ions being added to the suspension in an amount of at least 0.1 equivalent but not more than 1 equivalent based on the $Co^{+2}$ ions, and said alkali solution contains alkali in such an amount that after neutralization of the $Co^{+2}$ and $Fe^{+3}$ ions the hydroxyl ion concentration of the suspension is at least about 0.5 mol/liter.

2. The process of claim 1, wherein said ferromagnetic iron oxide is maghemite, magnetite, a Berthollide iron oxide of the formula $FeO_x$ in which $1.33 < x < 1.50$, or partially oxidized metallic iron.

3. The process of claim 1, wherein the $Fe^{+3}$ ions are provided by adding a water soluble ferric salt.

4. The process of claim 3, wherein said ferric salt is ferric chloride, ferric perchlorate, ferric bromide, ferric nitrate, ferric iodide, ferric sulfate, or ferric ammonium sulfate.

5. The process of claim 1, wherein the heat-treating is carried out at a temperature of 80° to 150° C.

6. The process of claim 1, wherein said aqueous solution containing $Co^{+2}$ ions is an aqueous solution of a water soluble cobalt salt or an aqueous solution containing cobalt hydroxide.

7. The process of claim 6, wherein said water soluble cobalt salt is an inorganic halide, inorganic acid salt, organic acid salt or complex salt of cobalt.

8. The process of claim 1, wherein the amount of the $Co^{+2}$ ions is 0.8 to 5 atomic percent.

9. The process of claim 1, wherein said alkali is an alkali hydroxide, an alkali carbonate, ammonia water, an aliphatic or aromatic amine, or mixtures thereof.

10. The process of claim 1, wherein an aqueous solution containing the $Fe^{+3}$ ions is added after the aqueous solution of $Co^{+2}$ ions and the aqueous alkali solution have been added.

11. The process of claim 1, wherein the aqueous alkali solution is added before and after adding the $Fe^{+3}$ ion solution.

12. The process of claim 1, wherein the aqueous alkali solution is added after adding the aqueous solution containing $Co^{+2}$ ions.

13. The process of claim 1, wherein the aqueous solution containing $Co^{+2}$ ions is added after the aqueous alkali solution is added.

14. The process of claim 1, wherein the aqueous alkali solution is added before and after the aqueous solution containing $Co^{+2}$ ions is added.

15. The process of claim 1, wherein the cobalt present in the Co- and Fe-coated ferromagnetic powder is not in the form of cobalt ferrite.

* * * * *